United States Patent
Zhao

(10) Patent No.: US 12,401,167 B2
(45) Date of Patent: Aug. 26, 2025

(54) GAS CONTROL METHOD AND RELATED USES

(71) Applicant: Cymer, LLC, San Diego, CA (US)

(72) Inventor: Yingbo Zhao, San Diego, CA (US)

(73) Assignee: Cymer, LLC, San Diego, CA (US)

(*) Notice: Subject to any disclaimer, the term of this patent is extended or adjusted under 35 U.S.C. 154(b) by 732 days.

(21) Appl. No.: 17/641,142

(22) PCT Filed: Sep. 10, 2020

(86) PCT No.: PCT/US2020/050235
§ 371 (c)(1),
(2) Date: Mar. 8, 2022

(87) PCT Pub. No.: WO2021/055236
PCT Pub. Date: Mar. 25, 2021

(65) Prior Publication Data
US 2022/0285902 A1 Sep. 8, 2022

Related U.S. Application Data

(60) Provisional application No. 62/902,946, filed on Sep. 19, 2019.

(51) Int. Cl.
*H01S 3/22* (2006.01)
*H01S 3/036* (2006.01)
(Continued)

(52) U.S. Cl.
CPC ............. *H01S 3/036* (2013.01); *H01S 3/104* (2013.01); *H01S 3/225* (2013.01); *H01S 3/2251* (2013.01);
(Continued)

(58) Field of Classification Search
CPC .......... H01S 3/036; H01S 3/104; H01S 3/225; H01S 3/2251; H01S 3/2253; H01S 3/2255; H01S 3/2256; H01S 3/2258
See application file for complete search history.

(56) References Cited

U.S. PATENT DOCUMENTS 5,642,374 A * 6/1997 Wakabayashi .......... H01S 3/134
372/57
5,978,406 A 11/1999 Rokni et al.
(Continued)

FOREIGN PATENT DOCUMENTS

| CN | 103620891 A | 3/2014 |
|---|---|---|
| JP | H07335961 A | 12/1995 |

(Continued)

OTHER PUBLICATIONS

Intellectual Property Office of Taiwan, Office Action and Search Report, counterpart Taiwanese Patent Application No. 111134876, mailed Jul. 18, 2023, 12 pages total (including English translation of 5 pages).

(Continued)

*Primary Examiner* — Kinam Park
(74) *Attorney, Agent, or Firm* — DiBerardino McGovern IP Group LLC

(57) ABSTRACT

Provided is a gas control system and method for online control of a gas compartment of a radiation source. The method includes measuring a parameter of a radiation source such as an excimer laser, the parameter describing an electrical stimulation applied to the laser and/or a characteristic of radiation generated by the laser and/or an amount of a consumable in the gas compartment. A function of the parameter is compared a to a threshold and if the parameter breaches the threshold, an amount of gas is calculated based on the parameter. An instruction is provided to provide or remove the amount of gas to or from, the gas compartment.

(Continued)

Gases may be injected or bled into the compartment during use of the radiation source thereby reducing or negating the need to take the radiation source offline to purge and refill the gas compartment.

28 Claims, 5 Drawing Sheets

(51) Int. Cl.
*H01S 3/104* (2006.01)
*H01S 3/225* (2006.01)

(52) U.S. Cl.
CPC ........... *H01S 3/2253* (2013.01); *H01S 3/2255* (2013.01); *H01S 3/2256* (2013.01); *H01S 3/2258* (2013.01)

(56) References Cited

U.S. PATENT DOCUMENTS

| | | | |
|---|---|---|---|
| 6,243,405 B1* | 6/2001 | Borneis | H01S 3/225 372/60 |
| 6,490,307 B1 | 12/2002 | de Mos et al. | |
| 6,952,253 B2 | 10/2005 | Lof et al. | |
| 9,130,337 B1* | 9/2015 | O'Brien | H01S 3/134 |
| 9,634,455 B1* | 4/2017 | Aggarwal | H01S 3/104 |
| 2001/0012309 A1 | 8/2001 | Albrecht et al. | |
| 2006/0239322 A1* | 10/2006 | Matsunaga | H01S 3/225 372/58 |
| 2008/0205472 A1 | 8/2008 | Dunstan et al. | |
| 2013/0003773 A1* | 1/2013 | O'Brien | H01S 3/104 372/55 |
| 2013/0100980 A1 | 4/2013 | Abe et al. | |
| 2013/0170516 A1* | 7/2013 | Riggs | H01S 3/104 372/58 |
| 2014/0105238 A1* | 4/2014 | Kurosu | H01S 3/041 372/58 |
| 2015/0138631 A1* | 5/2015 | Russin | H01S 3/036 359/342 |
| 2016/0248215 A1 | 8/2016 | Suzuki et al. | |
| 2016/0254634 A1* | 9/2016 | Asayama | H01S 3/225 372/38.04 |
| 2016/0359291 A1* | 12/2016 | Asayama | G03F 7/70025 |
| 2017/0063016 A1 | 3/2017 | Vininski et al. | |
| 2017/0201057 A1* | 7/2017 | Ahlawat | H01S 3/036 |
| 2017/0229832 A1 | 8/2017 | Ahlawat et al. | |
| 2018/0191122 A1* | 7/2018 | Suzuki | B01D 53/04 |
| 2018/0337510 A1 | 11/2018 | Koura et al. | |
| 2019/0017924 A1 | 1/2019 | Duffey | |

FOREIGN PATENT DOCUMENTS

| | | |
|---|---|---|
| JP | 2006229258 A | 8/2006 |
| JP | 2007043212 A | 2/2007 |
| JP | 2014518456 A | 7/2014 |
| TW | 454370 B | 9/2001 |
| TW | 200847558 A | 12/2008 |
| TW | 201714373 A | 4/2017 |
| TW | 201902061 A | 1/2019 |
| TW | 201917374 A | 1/2019 |

OTHER PUBLICATIONS

Japan Patent Office Examiner Takakazu Ueki, Office Action, counterpart Japanese Patent Application No. 2022-514179, mailed Apr. 11, 2023, 7 pages total (including English translation of 4 pages).
Anna Cortona, European Patent Office International Searching Authority, International Search Report and Written Opinion, corresponding PCT Application No. PCT/US2020/050235, mailed Nov. 12, 2020, 17 pages total.
Intellectual Property Office of Taiwan, Office Action and Search Report, counterpart Taiwanese Patent Application No. 111134876, mailed Mar. 29, 2023, 17 pages total (including English translation of 7 pages).

\* cited by examiner

GAS CONTROL METHOD AND RELATED USES

CROSS REFERENCE TO RELATED APPLICATION

This application claims priority to U.S. Application No. 62/902,946, filed Sep. 19, 2019 and titled GAS CONTROL METHOD AND RELATED USES, which is incorporated herein in its entirety by reference.

FIELD

The present invention relates to a gas control method and related uses. In particular, it relates to a gas control method for a radiation source.

BACKGROUND

A lithographic apparatus is a machine constructed to apply a desired pattern onto a substrate. A lithographic apparatus can be used, for example, in the manufacture of integrated circuits (ICs). A lithographic apparatus may, for example, project a pattern (also often referred to as "design layout" or "design") of a patterning device (e.g., a mask) onto a layer of radiation-sensitive material (resist) provided on a substrate (e.g., a wafer).

As semiconductor manufacturing processes continue to advance, the dimensions of circuit elements have continually been reduced while the amount of functional elements, such as transistors, per device has been steadily increasing over decades, following a trend commonly referred to as 'Moore's law'. To keep up with Moore's law the semiconductor industry is chasing technologies that enable the creation of increasingly smaller features. To project a pattern on a substrate a lithographic apparatus may use electromagnetic radiation. The wavelength of this radiation at least partially determines the minimum size of features that are patterned on the substrate. Typical wavelengths currently in use are 365 nm (i-line), 248 nm, 193 nm and 13.5 nm. A lithographic apparatus, which uses extreme ultraviolet (EUV) radiation, having a wavelength within a range of 5 nm to 100 nm, for example 6.7 nm or 13.5 nm, may be used to form smaller features on a substrate than a lithographic apparatus which uses, for example, radiation with a wavelength of 193 nm.

One known type of radiation source is an excimer laser. Excimer lasers typically use a combination of a noble gas (e.g. argon, krypton or xenon) and a reactive gas (e.g. fluorine or chlorine) for the production of laser light. Under conditions of electrical stimulation and controlled pressure, an excimer molecule is created which dissociates, giving rise to laser light, for example at the wavelengths listed above.

Conventional excimer lasers typically have a gas compartment with the gas at a predetermined pressure and predetermined concentration. This predetermined pressure and predetermined concentration are chosen depending on an expected use characteristic (e.g. expected frequency of use, duty cycle, and/or driving voltage) and are chosen so as to improve the efficiency of the laser under use with said expected use characteristic. The expected use characteristic is typically chosen based on what a customer will 'typically' use. The use characteristics that are typically used may be referred to as an average use case. If a user operates the laser with a non-expected characteristic then the efficiency of the laser may be reduced. That is, if a user operates the laser with characteristics different to the average use case, then the efficiency of the laser may be reduced.

The efficiency of a conventional excimer laser typically reduces over time, for example due to the consumption of reactive gases and/or laser modules aging. This reduction in efficiency is typically overcome by purging and refilling the gas periodically. In a purge and refill process, the gas compartment is emptied and brought to vacuum or near vacuum and refilled with gas at the predetermined pressure and predetermined concentration.

It is common for reactive gases to interact with inner surfaces of the gas compartment (for example via absorption, adsorption and other reactions), thereby reducing the concentration of that reactive gas within the gas compartment. Reactive gases are also consumed to generate the radiation in the gas compartment, thereby reducing the concentration of that reactive gas within the gas compartment. That is, some gases may be considered consumables. Typically, consumables diminish over time and hence need replenishing and/or replacing. In conventional excimer laser systems, the known methods are largely unable to effectively or efficiently measure or predict the consumption of consumables. As a result, in the past it has been more appropriate to purge and refill the gas compartment in order to ensure the gas is reset to a desired state. The known purge and refill process is performed periodically, for example every few weeks.

During a purge and refill process, the laser must be taken offline (i.e. the laser does not generate radiation during the purge and refill process). Taking the laser offline negatively affects a user's throughput (e.g. the use of a lithographic apparatus configured to receive radiation from the laser is interrupted for a significant amount of time).

It may be desirable to provide an improved excimer laser. For example, it may be desirable to provide an excimer laser that has an improved control of efficiency than known excimer lasers, and/or which overcomes some other disadvantage associated with conventional excimer lasers whether mentioned herein or elsewhere.

SUMMARY

According to a first aspect of the invention there is provided a method of controlling a gas control system of a gas compartment of a radiation source, the method comprising measuring a parameter of the excimer laser, wherein the parameter describes an electrical stimulation applied to the laser and/or a characteristic of radiation generated by the laser and/or an amount of a consumable in the gas compartment; comparing a function of the parameter to a threshold; calculating, responsive to determining that the parameter breaches the threshold, an amount of gas based on the parameter; and providing an instruction to the gas control system to provide the amount of gas to, or remove the amount of gas from, the gas compartment.

The provision of a gas control system and its associated method of use advantageously enables online gas control of the pressure of gas in the gas compartment and/or the relative concentration of different gases in the compartment. That is, the gas control system can be used to inject or bleed gases during use of the radiation source thereby reducing or negating the need to take the radiation source offline to purge and refill the gas compartment. Online gas control advantageously reduces or avoids the loss of time associated with a purge and refill process. Online gas control advantageously increases the ability of a radiation source to be tailored to an individual user's requirements, for example if a user wishes to operate the radiation source with a non-expected parameter such as (but not limited to) a lower duty cycle, without jeopardizing efficiency. The radiation source may be an excimer laser.

The function of the parameter may be any function of one or more parameters. The function may be a unitary function i.e. the function of the parameter may simply be the parameter.

The radiation source may generate radiation during the provision of gas to, or removal of gas from, the gas compartment. The radiation may be pulsed. The gas compartment may contain a gas. The gas in the compartment may comprise a combination of gases. That is, the gas may comprise gas of a first species and gas of a second species. The combination of gases may comprise an inert gas and a reactive gas. The inert gas may comprise a noble gas e.g. argon, krypton etc. The reactive gas may comprise a halogen e.g. fluorine.

Calculating an amount of gas may further comprise calculating a gas characteristic based on the function of the parameter. Beneficially, by calculating a gas characteristic associated with the laser, standard and known gas theory and/or empirical observations and/or use cases may be used to calculate an amount of gas. Beneficially, by calculating a gas characteristic associated with the laser, the amount of gas may be calculated accurately and efficiently.

Calculating an amount of gas may be further based on the gas characteristic.

The gas characteristic may comprise a gas pressure and/or a gas concentration. The gas characteristic may comprise another characteristic relating to pressure, for example volume, number of molecules, temperature. The gas characteristic may comprise a measure of concentration e.g. an amount of a first and/or second gas and/or a relative concentration of a first and/or second gas.

The amount of gas may comprise an amount of a first gas and an amount of a second gas.

Beneficially, by providing and/or removing a first and second gas, the concentration of gas in the gas compartment may be controlled. The first gas and second gas may be different species.

The method may further comprise measuring a first and second parameter. Additionally, more than two parameters may be measured.

The amount of gas may be calculated based on the first and second parameter. More than two parameters may be used to calculate the amount of gas. Beneficially, using more than one parameter to calculate the amount of gas may provide a more accurate calculation than using a single parameter or no parameters. Beneficially, using more than one parameter to calculate the amount of gas may enable more than one characteristic of the gas in the gas compartment to be controlled. For example, a gas pressure and a gas concentration may be controlled.

The first parameter may be the amount of a consumable in the gas compartment. Beneficially, using the amount of a consumable to calculate the amount of gas may provide a more accurate calculation. Beneficially, using the amount of a consumable to calculate the amount of gas may enable more than one characteristic of the gas in the gas compartment to be controlled. For example, the gas pressure and the amount of a consumable in the gas compartment may be controlled.

The method may further comprise using a sensor to measure the amount of a consumable in the gas compartment. Using a sensor for measuring the amount of a consumable advantageously improves an ability of the consumable to be replenished accurately without using a purge and refill process. The use of a sensor for measuring the amount of a consumable advantageously further reduces or avoids the loss of time associated with a purge and refill process.

The sensor may comprise a reactive gas sensor.

The sensor may comprise a fluorine sensor. For example, the sensor may comprise an F2 sensor.

The threshold may comprise a function of a predetermined parameter. The function may be unitary (i.e. the threshold may simply be the predetermined parameter). The threshold may comprise any function of multiple predetermined parameters. Said predetermined parameters may describe an electrical stimulation applied to the laser and/or a characteristic of radiation generated by the laser and/or an amount of a consumable in the gas compartment The method may further comprise, responsive to determining that the function of the parameter exceeds the threshold, updating a counter associated with the parameter. The counter may be updated by increasing or decreasing it by a predetermined amount. The counter may be updated by increasing or decreasing it by a function, for example a function of a measured parameter and a threshold.

The calculation of the amount of gas may be additionally based on the counter.

The method may further comprise: recording a first set of measurements of the parameter; calculating a first function of said first set of measurements; recording a second set of measurements of the parameter; calculating a second function of said second set of measurements; and calculating the amount of gas based on the first and second functions. The first function may be an average of the first set of measurements. The second function may be an average of the second set of measurements. The second function may be updated periodically. The second function may be recalculated after a new measurement. The second function may be recalculated after a given time interval. The second function may, for example, be a moving average.

According to a second aspect of the invention there is provided a radiation source comprising a gas compartment, a gas control system configured to provide an amount of gas to, or remove an amount of gas from, the gas compartment, and a processor configured to perform the method of the first aspect.

The provision of a gas control system advantageously enables online gas control of the pressure of gas in the gas compartment and/or the relative concentration of different gases in the compartment. That is, the gas control system can be used to inject or bleed gases during use of the radiation source (i.e. when the radiation source is generating radiation) thereby reducing or negating the need to take the radiation source offline to perform a purge and refill process. Online gas control advantageously reduces or avoids the loss of operational time of the radiation source that is associated with a purge and refill process. Online gas control advantageously improves an ability of the radiation source to be tailored to an individual user's requirements, for example if a user wishes to operate the radiation source with a non-expected parameter such as (but not limited to) a lower duty cycle, without jeopardizing efficiency. The radiation source may be an excimer laser.

The gas control system may further comprise a first pipeline connected at a first end to a first gas source or a gas sink and at a second end to the gas compartment. The gas source may be, for example, a gas supply. The gas sink may be, for example, a container designed to receive gas. The first pipeline may comprise a conduit and/or may take any form or shape.

The gas control system may further comprise a second pipeline connected at a first end to a second gas source or a second gas sink and at a second end to the gas compartment. The second gas source may be, for example, a gas supply. The second gas sink may be, for example, a container designed to receive gas. The second pipeline may comprise a conduit and/or may take any form or shape.

The radiation source may further comprise a gas control apparatus configured to control a flow of gas between the gas compartment and the first and/or second gas source or sink.

The radiation source may further comprise a sensor configured to measure an amount of a consumable in the compartment.

The sensor may be located in the gas compartment. Alternatively, the sensor may be located outside a main chamber of the gas compartment. The sensor may, for example, be connected to the gas compartment e.g. via a pipeline.

The sensor may comprise a reactive gas sensor.

The sensor may comprise a fluorine sensor. For example, the sensor may comprise an F2 sensor.

According to a third aspect of the invention there is provided a radiation source comprising a gas compartment and a sensor for measuring an amount of a consumable in the gas compartment.

Using a sensor for measuring the amount of a consumable advantageously improves an accuracy with which a consumable may be replenished whilst avoiding the need to perform a purge and refill process. The use of a sensor for measuring the amount of a consumable advantageously avoids the loss of time associated with a purge and refill process.

The sensor may comprise a reactive gas sensor.

The sensor may comprise a fluorine sensor. For example, the sensor may comprise an F2 sensor.

The radiation source may further comprise a gas control system configured to provide an amount of gas to, or remove an amount of gas from, the gas compartment. The gas control system may be the gas control system described in the second aspect.

According to a fourth aspect of the invention there is provided a gas control system configured to provide an amount of gas to, or remove an amount of gas from, a gas compartment of a radiation source, and further configured to perform the method of the first aspect.

The gas control system may comprise a first pipeline configured for connection at a first end to a first gas source or sink and at a second end to the gas compartment. The gas source may be, for example, a gas supply. The gas sink may be, for example, a container designed to receive gas. The first pipeline may comprise a conduit and/or may take any form or shape.

The gas control system may further comprise a second pipeline configured for connection at a first end to a second gas source or sink and at a second end to the gas compartment. The gas source may be, for example, a gas supply. The gas sink may be, for example, or a container designed to receive gas. The second pipeline may comprise a conduit and/or may take any form or shape.

The gas control system may further comprise a gas control apparatus configured to control a flow of gas between the gas compartment and the first and/or second gas source or sink.

According to a fifth aspect of the invention there is provided a radiation source according to the second or third aspect, further comprising a processor configured to perform the method of the first aspect.

According to a sixth aspect of the invention there is provided a lithographic apparatus comprising the radiation source of the second, third, or fifth aspects.

According to a seventh aspect of the invention, there is provided a computer program comprising instructions to cause the device of any of the second, third, fourth, fifth or sixth aspects to execute the steps of the method of the first aspect. The device may be a radiation source and/or a lithographic apparatus and/or a gas control system.

According to an eighth aspect of the invention, there is provided a computer-readable medium having stored thereon the computer program of the seventh aspect.

As will be apparent to the skilled person, features described with respect to one aspect herein may be used in combination with other aspects described herein.

BRIEF DESCRIPTION OF THE DRAWINGS

Embodiments of the invention will now be described, by way of example only, with reference to the accompanying schematic drawings, in which.

DETAILED DESCRIPTION

In the present document, the terms "radiation" and "beam" are used to encompass all types of electromagnetic radiation, including ultraviolet radiation (e.g. with a wavelength of 365, 248, 193, 157 or 126 nm) and EUV (extreme ultra-violet radiation, e.g. having a wavelength in the range of about 5-100 nm).

The term "reticle", "mask" or "patterning device" as employed in this text may be broadly interpreted as referring to a generic patterning device that can be used to endow an incoming radiation beam with a patterned cross-section, corresponding to a pattern that is to be created in a target portion of the substrate. The term "light valve" can also be used in this context. Besides the classic mask (transmissive or reflective, binary, phase-shifting, hybrid, etc.), examples of other such patterning devices include a programmable mirror array and a programmable LCD array.

Figure 1:
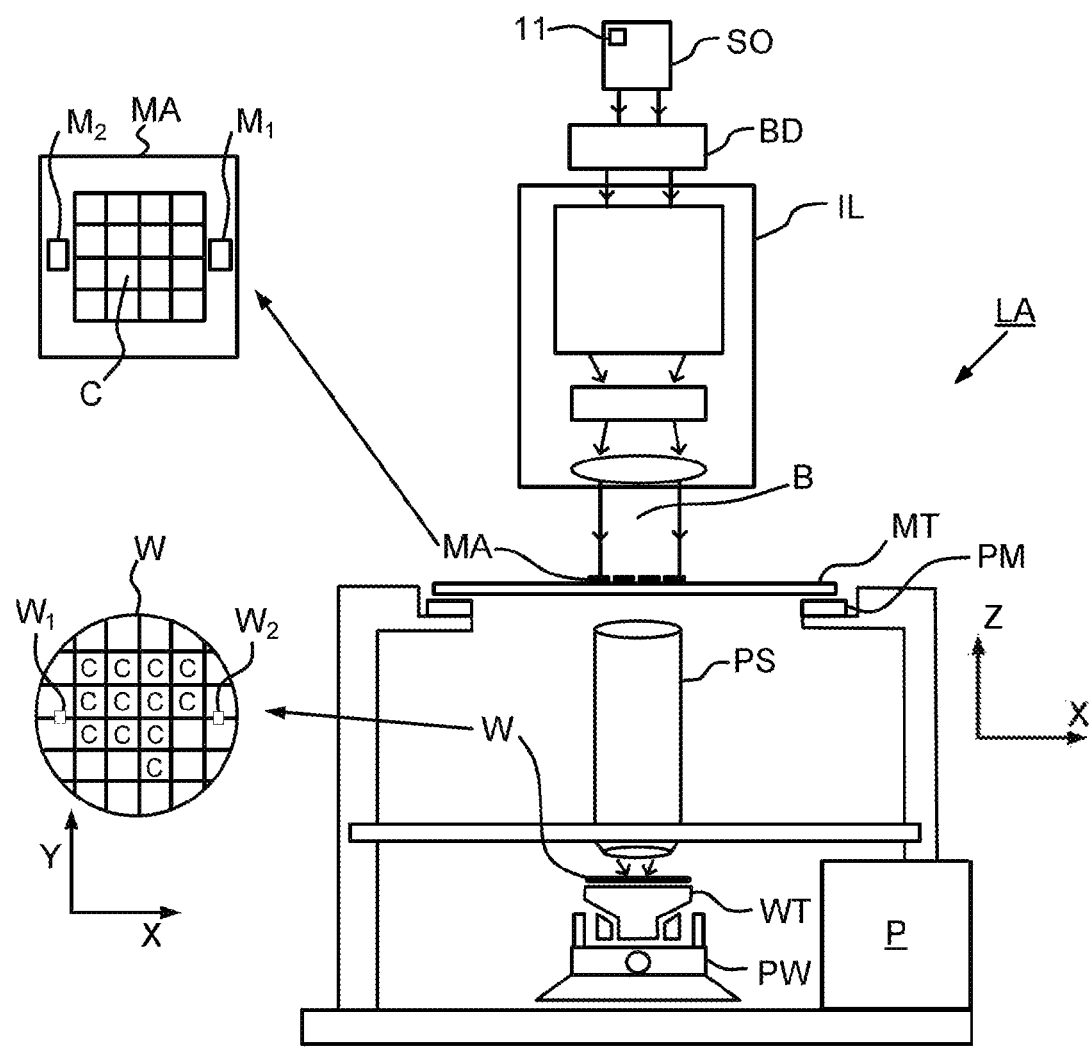
FIG. 1 schematically depicts a lithographic apparatus comprising a gas control system.

FIG. 1 schematically depicts a lithographic apparatus LA. The lithographic apparatus LA includes an illumination system (also referred to as illuminator) IL configured to condition a radiation beam B (e.g., UV radiation, DUV radiation or EUV radiation), a mask support (e.g., a mask table) MT constructed to support a patterning device (e.g., a mask) MA and connected to a first positioner PM configured to accurately position the patterning device MA in accordance with certain parameters, a substrate support (e.g., a wafer table) WT constructed to hold a substrate (e.g., a resist coated wafer) W and connected to a second positioner PW configured to accurately position the substrate support WT in accordance with certain parameters, and a projection system (e.g., a refractive projection lens system) PS configured to project a pattern imparted to the radiation beam B by patterning device MA onto a target portion C (e.g., comprising one or more dies) of the substrate W.

In operation, the illumination system IL receives a radiation beam from a radiation source SO, e.g. via a beam delivery system BD. The radiation source SO comprises a gas control system 11 configured to provide an amount of gas to, or remove an amount of gas from, a portion of the radiation source SO in accordance with the methods described herein. Further details of the gas control system 11 and associated methods are provided below. The illumination system IL may include various types of optical components, such as refractive, reflective, magnetic, electromagnetic, electrostatic, and/or other types of optical components, or any combination thereof, for directing, shaping, and/or controlling radiation. The illuminator IL may be used to condition the radiation beam B to have a desired spatial and angular intensity distribution in its cross section at a plane of the patterning device MA.

The term "projection system" PS used herein should be broadly interpreted as encompassing various types of projection system, including refractive, reflective, catadioptric, anamorphic, magnetic, electromagnetic and/or electrostatic optical systems, or any combination thereof, as appropriate for the exposure radiation being used, and/or for other factors such as the use of an immersion liquid or the use of a vacuum. Any use of the term "projection lens" herein may be considered as synonymous with the more general term "projection system" PS.

The lithographic apparatus LA may be of a type wherein at least a portion of the substrate may be covered by a liquid having a relatively high refractive index, e.g., water, so as to fill a space between the projection system PS and the substrate W—which is also referred to as immersion lithography. More information on immersion techniques is given in U.S. Pat. No. 6,952,253, which is incorporated herein by reference.

The lithographic apparatus LA may also be of a type having two or more substrate supports WT (also named "dual stage"). In such "multiple stage" machine, the substrate supports WT may be used in parallel, and/or steps in preparation of a subsequent exposure of the substrate W may be carried out on the substrate W located on one of the substrate support WT while another substrate W on the other substrate support WT is being used for exposing a pattern on the other substrate W.

In addition to the substrate support WT, the lithographic apparatus LA may comprise a measurement stage. The measurement stage is arranged to hold a sensor and/or a cleaning device. The sensor may be arranged to measure a property of the projection system PS or a property of the radiation beam B. The measurement stage may hold multiple sensors. The cleaning device may be arranged to clean part of the lithographic apparatus LA, for example a part of the projection system PS or a part of a system that provides the immersion liquid. The measurement stage may move beneath the projection system PS when the substrate support WT is away from the projection system PS.

In operation, the radiation beam B is incident on the patterning device, e.g. mask, MA which is held on the mask support MT, and is patterned by the pattern (design layout) present on the patterning device MA. Having traversed the mask MA, the radiation beam B passes through the projection system PS, which focuses the beam onto a target portion C of the substrate W. With the aid of the second positioner PW and a position measurement system (not shown), the substrate support WT can be moved accurately, e.g., so as to position different target portions C in the path of the radiation beam B at a focused and aligned position. Similarly, the first positioner PM and possibly another position sensor (which is not explicitly depicted in FIG. 1) may be used to accurately position the patterning device MA with respect to the path of the radiation beam B. Patterning device MA and substrate W may be aligned using mask alignment marks M1, M2 and substrate alignment marks W1, W2. Although the substrate alignment marks W1, W2 as illustrated occupy dedicated target portions, they may be located in spaces between target portions. Substrate alignment marks W1, W2 are known as scribe-lane alignment marks when these are located between the target portions C.

Figure 2:
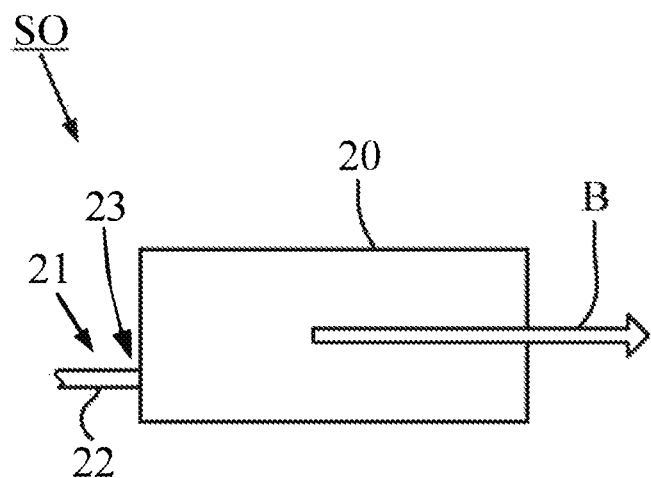
FIG. 2 schematically depicts an example radiation source comprising a gas control system.

FIG. 2 schematically depicts a radiation source SO according to an example implementation of the invention. The radiation source SO comprises an excimer laser, and may herein be referred to simply as a source or a laser SO. The laser SO may also be referred to as a laser system. The laser SO comprises a gas compartment 20. The gas compartment 20 may also be referred to as a compartment, a gas chamber or simply a chamber. The gas compartment 20 contains gas, for example a combination of a noble gas (e.g. argon, krypton, neon or xenon) and a reactive gas (e.g. a halide such as fluorine or chlorine). The gas has a relative concentration depending on the relative amounts of different gases in the combination, e.g. the amount of krypton relative to the amount of fluorine. The relative concentration may be referred to simply as the concentration. The gas is held within the compartment at a controlled pressure. For example, the gas may have a pressure in the range 200-500 kPa.

Electrical stimulation is provided to the gas within the gas compartment 20. For example, a voltage may be delivered to electrodes (not shown) on or within the gas compartment 20. Radiation is generated and emitted from the gas compartment 20, for example through an aperture (not shown). The radiation forms the radiation beam B which may be delivered to an illumination system IL of a lithographic apparatus (e.g. see FIG. 1).

In use, properties of the gas in the gas compartment 20 may change. The gas pressure in the gas compartment 20 may vary. The temperature of the gas in the gas compartment 20 may vary. In use, temperature and/or pressure in the gas compartment 20 are controlled so as not to stray from selected values. Alternatively or additionally, the concentration of gases may change. It should be understood that the concentration of a gas (which is a combination of multiple gases) is a measure of the amount of a first gas compared to the total amount of gas in the gas compartment 20. Some gases may be considered as being consumables. Consumables may diminish over time and hence may need replacing.

The laser SO further comprises a gas control system 21. The gas control system 21 controls the flow of gas into and/or out of the gas compartment 20. That is, it can provide gas to or remove gas from the gas compartment 20. The gas control system 21 comprises a pipeline 22 connected to the gas compartment 20 at a first end 23.

The pipeline 22 is also connected to an external gas supply (not shown) at another end (not shown), and is operable to deliver gas from the external gas supply to the gas compartment 20. The external gas supply may be referred to as a gas source. This process may also be referred to as injecting gas, providing gas, delivering gas or pushing gas into the gas compartment 20. Injecting gas may increase the gas pressure in the gas compartment 20. Additionally or alternatively, injecting gas may alter the relative concentration of a type of gas. For example, injecting additional fluorine gas into a combination of argon and fluorine gases may increase the relative concentration of fluorine with respect to argon. Alternatively, the pipeline 22 may be operable to remove gas from the gas compartment 20. This process may be referred to as bleeding gas. Bleeding gas can reduce the gas pressure in the gas compartment 20. The removed gas may be returned to the external gas supply or another gas apparatus, for example a waste container or gas removal apparatus, all of which may be referred to as a gas sink.

The term pipeline used herein may be taken to mean a conduit for the transport of fluid or gas. The conduit may take any form or shape, and is limited only in that it must be capable of transporting fluid, e.g. gas.

The gas control system 21 may further comprise one or more valves and/or pumps (not shown), as well as any other gas control apparatus. The pipeline 22 may for example be connected to the gas compartment 20 by a valve, whereby the valve may control the flow of gases between the pipeline 22 and compartment 20 (or between the gas compartment 20 and pipeline 22). The gas control apparatus may hence control the flow of gas from the gas source to the gas compartment 20 and/or the flow of gas from the gas compartment 20 to the gas sink (i.e. the gas control apparatus may control the flow of gas between the gas source and the gas compartment 20, and between the gas compartment 20 and the gas sink). A pump may be used to actuate the flow of gas in a desired direction.

The gas control system may further comprise a processor and/or a computer-implemented means of operating the gas control system. The processor may be used to operate the valve and/or pump, for example by sending instructions to the valve and/or pump. The instructions may be, for example, open a valve, close a valve, increase flow, reduce flow, stop flow, start flow etc.

Figure 3:
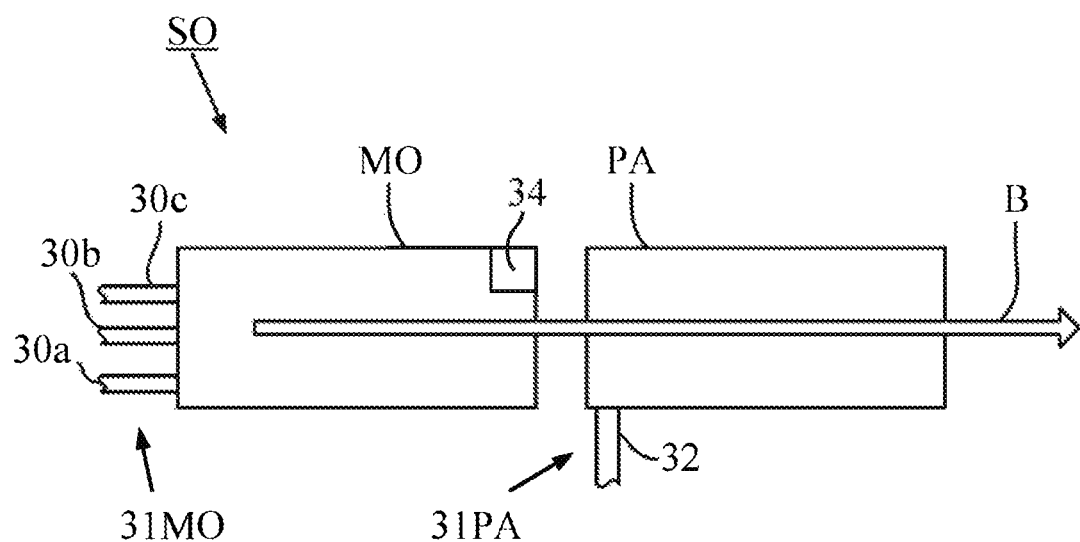
FIG. 3 schematically depicts another example radiation source comprising a gas control system.

FIG. 3 depicts another example radiation source SO according to an embodiment of the invention. The radiation source SO is an excimer laser and may herein be referred to simply as a source or a laser SO. The laser SO in FIG. 3 comprises two gas compartments MO, PA. The gas compartments contain gas, for example a combination of a noble gas (e.g. argon, krypton, neon or xenon) and a reactive gas (e.g. a halide such as fluorine or chlorine). The gas has a relative concentration depending on the relative amounts of different gases in the combination, e.g. the amount of krypton relative to the amount of fluorine. The relative concentration may be referred to simply as the concentration. The gas has a gas pressure. The gas pressure in each gas compartment MO, PA may be different. The gas type and/or concentration may be the same in each gas compartment MO, PA, or may be different in each gas compartment MO, PA.

The first gas compartment may be referred to as a master oscillator MO and acts as a seed laser wherein laser radiation is created. Electrical stimulation is provided across or within the master oscillator MO, for example by delivering a voltage to electrodes (not shown) on or within the gas compartment MO. Radiation is generated by the laser in the master oscillator MO which may be delivered to the second gas compartment PA. The second gas compartment may be referred to as a power amplifier PA and acts as an amplifier wherein laser radiation received from the master oscillator MO is amplified to a higher power Amplified radiation exits the power amplifier PA and forms the radiation beam B which may be delivered to an illumination system IL of a lithographic apparatus (e.g. see FIG. 1).

The laser SO further comprises two gas control systems 31MO, 31PA. Each gas control system 31MO, 31PA controls the flow of gas into and/or out of the master oscillator MO and power amplifier PA, respectively. That is, the gas control systems 31MO, 31PA can provide gas to or remove gas from the gas compartments MO, PA. While the gas control systems 31MO, 31PA in FIG. 3 are illustrated as separate gas control systems, they may alternatively constitute one singular gas control system.

Each gas control system 31MO, 31PA comprises a number of pipelines 30a-c, 32 connected to the gas compartments MO, PA at first ends (not shown) of each pipeline 30a-c, 32. Each pipeline 30a-c, 32 is comparable to the pipeline 22 described in reference to FIG. 2 and may be operated as such. For example, each pipeline 30a-c, 32 may be connected to a gas source and/or to a gas sink (not shown) and may be operable to provide gas to or remove gas from its respective compartment MO, PA. The term "pipeline" used herein may be understood to mean a conduit for the transport of fluid or gas. The conduit may take any form or shape, and is limited only in that it must be capable of transporting fluid, e.g. gas.

The gas control systems 31MO, 31PA may further comprise one or more valves and/or pumps (not shown), as well as any other gas control apparatus. The pipelines 30a, 30b, 30c, 32 may for example be connected to their respective gas compartment MO, PA by a valve, whereby the valve may control the flow of gases between the pipelines and gas compartment 30a-c, 32 MO, PA (or between the gas compartments MO, PA and pipelines 30a-c, 32). The gas control apparatus may hence control the flow of gas from a gas source to one or both of gas compartments MO, PA and/or the flow of gas from one or more of gas compartments MO, PA to a gas sink (i.e. the gas control apparatus may control the flow of gas between the gas source(s) and the gas compartments MO, PA, and between the gas compartments MO, PA and the gas sink(s)). A pump may be used to actuate the flow of gas in the desired direction.

The gas control systems 31MO, 31PA may further comprise a processor (not shown) and/or a computer-implemented means of operating the gas control systems 31MO, 31PA. A processing means may be used to operate the valve and/or pump, for example by sending instructions to the valve(s) and/or pump(s). The instructions may comprise demands such as, for example, open a valve, close a valve, increase flow, reduce flow, stop flow, start flow etc.

The first gas control system 31MO comprises three pipelines 30a-c connected to the master oscillator MO. A first pipeline 30a is connected to a first external gas supply (not shown), e.g. a krypton gas supply, and is operable to deliver a first gas (e.g. krypton) to the master oscillator MO. A second pipeline 30b is connected to a second external gas supply (not shown), e.g. a fluorine gas supply, and is operable to deliver a second gas (e.g. fluorine) to the master oscillator MO. By altering the gas flow from the first and second pipelines 30a, 30b the pressure of gas and relative concentration of the first and second gases may be controlled. The third pipeline 30c is operable to remove gas from the master oscillator MO, thereby reducing gas pressure in the master oscillator MO. The first and second pipelines 30a, 30b may be referred to as inlet pipelines. The third pipeline 30c may be referred to as an outlet pipeline.

The master oscillator MO also comprises a sensor 34. The sensor 34 is selected to measure a consumable. For example, the sensor 34 may measure an amount of a reactive gas in the first gas compartment MO. In a particular example, the sensor 34 comprises a fluorine sensor (e.g. a F2 sensor) for measuring the amount of fluorine in the first gas compartment MO. Beneficially, by measuring an amount of a consumable in the first gas compartment MO of the laser SO, said consumable may be monitored and replenished as required. The use of a sensor 34 to measure a consumable is particularly advantageous in combination with a gas control system 31MO with multiple pipelines 30a-c because the consumption of a consumable may change the concentration of a gas. A gas control system 31MO with multiple pipelines 30a-c capable of providing different gases may be used to attain a desired concentration in the first gas compartment MO following the depletion of a consumable. In a specific example, a fluorine sensor may monitor the amount of fluorine in an argon-fluorine gas. If the amount (or concentration) of fluorine in the first gas compartment MO falls below a desirable amount, the gas control system 31MO may instruct the provision of an amount of fluorine through the first pipeline 30a to the first gas compartment MO. Optionally, the second pipeline 30b may provide an amount of argon gas to the first gas compartment MO. By controlling the relative amounts of argon and fluorine provided, both the pressure and the concentration of the gas may be controlled. While the sensor 34 is depicted in the master oscillator MO, it may be provided in any compartment of an excimer laser SO e.g. the second gas compartment PA. Additionally or alternatively, the sensor 34 may be used in combination with any gas control system 31MO, 31PA.

In the example of FIG. 3, the second gas control system 31PA comprises a single pipeline 32 connected to the power amplifier PA. The single pipeline 32 comprises multiple conduits (not shown) associated with the single pipeline 32, for example the multiple conduits may be contained within the single pipeline 32. For example, the pipeline 32 may be a sheath containing multiple smaller conduits, or it may comprise a manifold assembly with multiple conduits. The multiple conduits associated with the single pipeline 32 may be comparable to the three pipelines 30a-c, and may be operated as such, but represent a different arrangement of pipelines/conduits.

It should be understood that the gas control systems 31MO, 31PA illustrated in FIG. 3 are not limited to use with a laser SO of this arrangement (e.g. with a master oscillator MO and a power amplifier PA) but can be used with any other arrangement of excimer laser, for example that depicted in FIG. 2. It should also be understood that any number of different arrangements of gas control system are possible. For example, for both the gas compartment MO and the gas compartment PA, any number of pipelines may be used e.g. one inlet and two outlets, or a manifold inlet and a single outlet.

The excimer lasers SO in FIGS. 2 and 3 are example arrangements of excimer laser radiation sources. However, other arrangements of excimer lasers are possible, for example with different numbers of gas compartments or in different orientations. Features of the invention can be applied to any arrangement of an excimer laser with at least one gas compartment and, as such, are not limited to either of the arrangements described above.

The efficiency of an excimer laser, for example the laser SO depicted in FIGS. 2 and 3, is a measure of the output energy of the radiation beam B compared to the energy supplied to the laser SO (for example through the application of a voltage to provide electrical stimulation of the gas). The efficiency of a laser SO may be affected by a number of variables such as, for example, the pressure of gas in the gas compartments, the relative concentrations of different gases in the gas compartments, the physical state of the interior of the gas compartments (for example, contamination in the gas compartment may reduce efficiency), and/or the characteristics of the user's use of the laser (for example frequency of use, duty cycle, or preferred driving voltage).

A gas control system enables online control of the provision and/or removal of gas from a gas compartment of the laser. That is, the laser may generate radiation during the provision and/or removal of gas. Taking the laser offline negatively affects the operation of the laser (i.e. use of the laser is interrupted for a significant amount of time). Therefore, providing a gas control system enables online control of the pressure of gas in the gas compartment and/or the relative concentration of different gases in the gas compartment. Provision of a gas control system therefore advantageously provides control over the efficiency of the laser.

Returning again to FIG. 2, the provision of a gas control system 21 enables online control of the pressure of gas in the gas compartment 20 and/or the relative concentration of different gases in the gas compartment 20. That is, the gas control system 21 can be used to inject or bleed gases during use of the laser SO (i.e. whilst the laser is generating radiation) thereby reducing or negating the need to purge and refill with the laser offline. This process may be referred to as online refill or online gas control. Online gas control advantageously avoids the loss of time associated with a purge and refill process. Online gas control advantageously enables characteristics of the gas in the gas compartment to be controlled whilst the laser is generating radiation, thereby increasing the amount of time for which the laser may be operational.

Online gas control may be particularly beneficial when used with a sensor for measuring an amount of a consumable in the laser, for example the reactive gas or fluorine sensor described above. A primary reason for reliance on a purge and refill process in known excimer laser systems is the inability to monitor the consumption of a consumable such as fluorine. To measure the amount of a consumable efficiently and effectively, a measuring device will preferably have one or more of the following characteristics: a high accuracy (e.g. ±0.01%), measure using only a small amount of gas (e.g. so as not to significantly reduce the gas pressure in the gas compartment), fast (e.g. measure more quickly than the concentration changes), small (e.g. significantly smaller than the gas compartment so as to be fitted in the gas compartment), a long lifetime (e.g. to avoid taking the laser offline to replace or repair the device). It has been found that the amount of a consumable may be measured efficiently and effectively using a sensor such as a reactive gas (e.g. fluorine) sensor. The amount of a consumable may be measured, e.g., using a sensor, and replenished accurately without a purge and refill process, thereby increasing the amount of time for which the laser may be operational. Alternatively or additionally to using a sensor, the amount of a consumable may be inferred or estimated, for example using theoretical estimations and usage parameters associated with the laser e.g. duty cycle, input voltage, output energy, etc., and the consumable may similarly be replenished accurately without a purge and refill process.

Online gas control also allows a system to be tailored to an individual user's requirements, for example if a user wishes to operate the laser with a non-expected parameter such as (but not limited to) a lower duty cycle, without jeopardizing an efficiency of the laser. The gas control systems 21, 31MO, 31PA shown in FIGS. 2 and 3 can be controlled using gas control methods and processes.

Example gas control methods and processes according to example implementations of the invention are described below.

Figure 4:
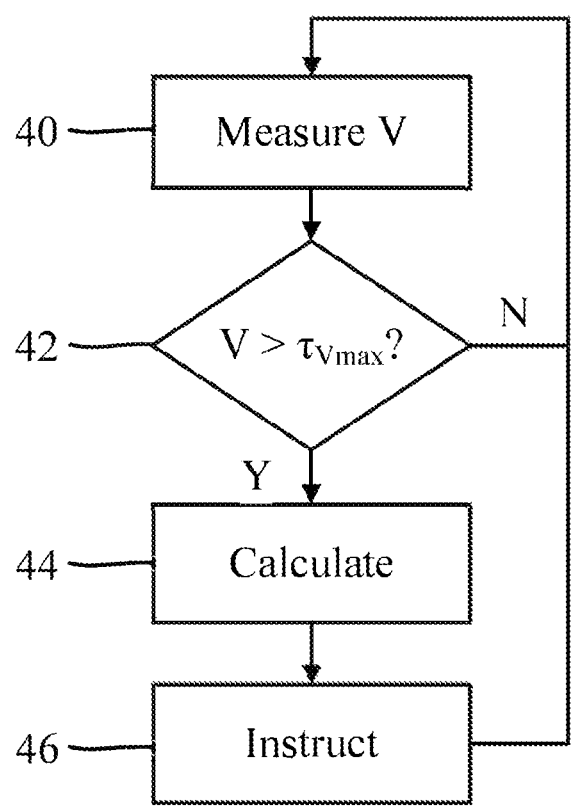
FIG. 4 is a flow chart that depicts an example process which may be used to control a gas control system.

FIG. 4 depicts an example process which may be used to control a gas control system. The process is an online gas control process. A first step 40 includes measuring a parameter of the laser. The parameter may describe an electrical stimulation applied to the laser (e.g. a voltage V) and/or radiation generated by the laser (e.g. an energy of output radiation) and/or an amount of a consumable in a gas compartment of the laser (e.g. an amount or concentration of a reactive gas such as fluorine). The example in FIG. 4 is depicted as measuring a voltage V, but the method can be applied correspondingly to any other appropriate parameter, for example output energy and/or an amount of a consumable. In this instance, it should be understood that the voltage V is provided to the laser so as to provide substantially consistent output radiation pulses, for example a target energy or dose for each pulse.

When measuring voltage V, an absolute voltage or a filtered voltage may be utilized. The absolute voltage V is a measure of the input electrical stimulation applied to the laser with no additional factors. The filtered voltage is calculated from the absolute voltage V and weighted by other factors associated with the laser and which are known to affect the efficiency, for example duty cycle, target energy output, gas concentration etc. The filtered voltage may be considered a function f(V) of the absolute voltage V. Beneficially, the filtered voltage may be measured and used with the methods described herein to improve efficiency and gas control for a known use case. Beneficially, the absolute voltage may be measured and used with the methods described herein to improve efficiency and gas control for an unknown use case. While voltage V has been described here, the same applies analogously to other parameters describing electrical stimulation e.g. current. In the methods described herein, it should be understood that, although voltage V or absolute voltage V is specifically referred to, any other parameter describing input electrical stimulation may be used e.g. filtered voltage, absolute current etc.

A second step 42 of the process includes comparing a function of the measured parameter to a parameter threshold, which may be referred to as simply a threshold. The function may be unitary (i.e. the function f(p) may be equal to the parameter p e.g. f(p)=1*p). The following example will be described using the situation wherein the function is unitary i.e. the parameter is compared to the parameter threshold. In other examples, the function may be any other function of the parameter, for example a filtered voltage which is described in more detail later.

The threshold in the example shown in FIG. 4 comprises a maximum voltage threshold $\tau_{V_{max}}$. If the measured voltage breaches the maximum voltage threshold $\tau_{V_{max}}$, further method steps take place whereas, if the measured voltage does not breach the maximum voltage threshold $\tau_{V_{max}}$, no action is taken and the method restarts. A breach may comprise the voltage exceeding the maximum voltage threshold $\tau_{V_{max}}$.

A third step 44 of the process includes calculating an amount of gas based on the parameter. The third step 44 is performed in response to determining that the voltage V breaches the threshold $\tau_{V_{max}}$. The calculation 44 may be based on the measured voltage V. For example, the calculation may be based on the magnitude by which the voltage V (or some function f(V) of the voltage V e.g. the filtered voltage) breaches the threshold $\tau_{V_{max}}$. The amount of gas may represent an amount of gas that may be required to be provided to (or removed from) the gas compartment of the laser so as to improve the gas pressure and/or gas concentration. For example, the amount of gas may be calculated so as to increase the efficiency and/or output energy of the laser and/or control the voltage supplied to the laser. The calculation 44 may be of an amount of a single gas or an amount of a gas mixture, or may comprise an amount of a first gas and an amount of a second gas. For example, a calculation of an amount of a first gas and an amount of a second gas may be beneficial if it is desired to decouple the pressure and concentration (e.g. to alter only the pressure or only the concentration, rather than both pressure and concentration simultaneously). The calculation 44 may, for example, be computed in a processor associated with the laser system as described above.

A fourth step 46 of the process includes providing an instruction to a gas control system to provide the amount of gas to, or remove the amount of gas from, a gas compartment of the laser. For example, the gas control system may be a gas control system described above and with reference to FIGS. 2 and 3. The act of removing or providing gas to the gas compartment of the laser in this way allows the gas pressure and/or concentration to be controlled online by monitoring parameters associated with the laser.

The process may then be performed again from the start. The process may be repeated continuously (i.e. constantly monitoring the parameter). Alternatively, one or more steps of the process may be repeated after a predetermined time has passed. The predetermined time may be a standard period of time e.g. every 20 ms. Alternatively, the predetermined time may be associated with a number of shots/pulses of the laser. The laser radiation is pulsed. That is, a number of pulses are emitted within a given time interval. Each pulse of radiation may be referred to as a shot. One shot of radiation is emitted each interval of time defined by the repetition rate of the laser. For example, if a laser is operating at 6 kHz, one shot is emitted approximately every 0.17 ms. It should be noted that, while the laser may emit pulsed radiation (that is, it may repeatedly emit a burst of radiation for a first period of time and emit no radiation for a second period of time), the laser is considered to be 'online' in both first and second time periods.

The system may count the number of shots and store a shot count S, for example using a processor. The shot count S may represent the number of shots that have occurred. A shot threshold may be chosen such that a process (or a step of a process) may be performed after a predetermined number of shots has occurred. If the shot threshold is set to Ts=1 million, the step occurs every millionth shot. If the shot threshold is set to Ts=10 million, the process step every 10 million shots. The shot threshold Ts may take any positive integer value. In one example process, the parameter is measured 40 every millionth shot, and an instruction 46 to the gas control system is provided every 20 million shots. The process may be performed iteratively ad infinitum.

Additional steps may take place within this process. For example, an additional decision may be added between the measuring step 40 and comparison step 42, or between the comparison step 42 and the calculation step 44 to determine whether or not the laser is in normal operation. For example, if the laser is undergoing calibration, warm-up, or other maintenance or non-standard operations, the voltage may not be in the preferred voltage range. As such, the system may be switched to a non-standard operation mode. Should the compare step 42 determine that the parameter breaches a threshold, but the laser is not in normal operation, the process may determine that no action is to be taken responsive to the breach of threshold. Alternatively or additionally, mode dependent thresholds may be used, for example should the laser be in an abnormal mode e.g. a calibration mode, the parameter may be compared to a calibration threshold, which is different to the threshold used during normal operation.

Alternatively or additionally, an additional decision may be added after the instruction 46 is provided to the gas control system (i.e. before the process restarts). This decision may determine whether the gas pressure and/or gas concentration in the gas compartment have changed. For example, a measurement of gas pressure in the gas compartment may be taken to determine whether the gas control system has successfully provided the calculated amount of gas. For example, if it is determined that the gas pressure has not changed, this may indicate a fault with the gas control system, or may indicate that additional changes are required prior to the next iteration in the process.

Figure 5:
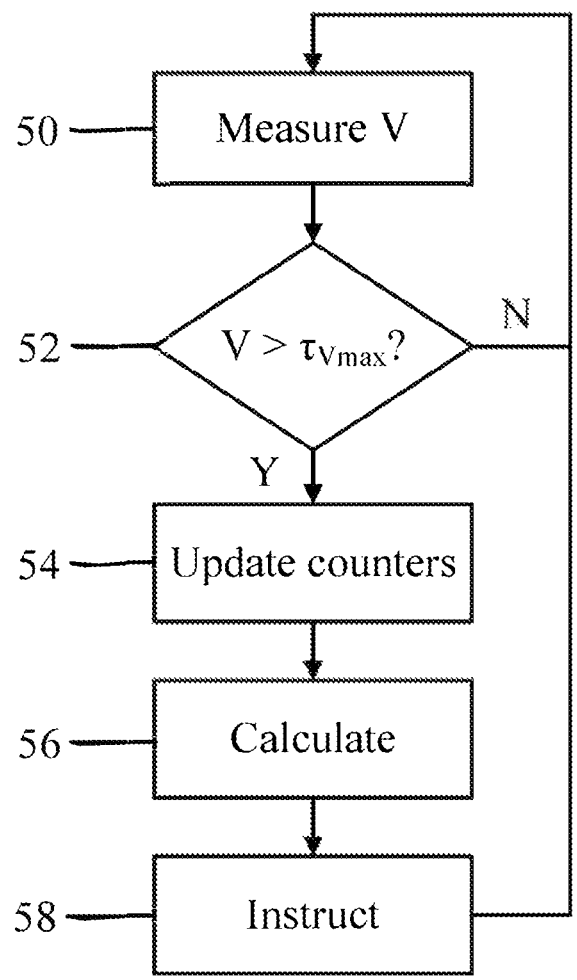
FIG. 5 is a flow chart that depicts another example process which may be used to control a gas control system.

FIG. 5 depicts another example process which may be used to control a gas control system. The process is an online refill process. A first step 50 of the process includes measuring a parameter of the laser. The parameter may describe an electrical stimulation applied to the laser (e.g. a voltage V) and/or radiation generated by the laser (e.g. an energy of output radiation) and/or an amount of a consumable in the gas compartment of the laser (e.g. an amount or concentration of a reactive gas such as fluorine). The example in FIG. 5 is depicted as measuring 50 a voltage V, but the method can be applied correspondingly to any other appropriate parameter. In this instance, it should be understood that the voltage V is provided to the laser so as to provide output radiation at a target energy.

A second step 52 of the process includes comparing the voltage to a parameter threshold, which may be referred to as simply a threshold. The threshold in the example shown in FIG. 5 comprises a maximum voltage threshold $\tau_{V_{max}}$. If the measured voltage breaches the maximum voltage threshold $\tau_{V_{max}}$, further method steps take place whereas, if the measured voltage does not breach the maximum voltage threshold $\tau_{V_{max}}$, no action is taken and the method restarts. Other thresholds may be used, such as a minimum voltage threshold. Multiple voltage thresholds may be monitored simultaneously and breaching of different ones of the multiple thresholds may lead to different actions being taken.

The process may store one or more values, for example thresholds and/or parameters and/or counters. The values may be stored on a processor or storage means, for example on a computer. In the process shown in FIG. 5, two counters are stored. Any number of counters may be stored. The counters are initialized with an arbitrary or a predetermined value.

A third step 54 of the process includes updating one or more counters. The counters in this instance are updated in response to determining that the voltage V breaches the threshold $\tau_{V_{max}}$. Example counter operations are described in more detail below and with reference to FIG. 6.

After the determination 52 that the measured voltage breaches the maximum voltage threshold $\tau_{V_{max}}$, and one or more counters have been updated 54, the process continues to a fourth step 56. The fourth step 56 includes calculating an amount of gas based on the parameter and the counters. For example, if the measured voltage V has breached the threshold $\tau_{V_{max}}$ multiple times, the counters will be updated multiple times, and the calculated amount of gas may be larger in magnitude than in the case of the measured voltage breaching the threshold $\tau_{V_{max}}$ a single time. The amount of gas may represent an amount of gas that is required to be provided to or removed from the gas compartment of the laser so as to improve the gas pressure and/or gas concentration. For example, the amount of gas may be calculated so as to increase the efficiency and/or output energy of the laser and/or control the voltage supplied to the laser. The gas calculation may be an amount of a single gas or an amount of a gas mixture, or may comprise an amount of a first gas and an amount of a second gas, for example if a change in concentration is beneficial. This calculation 56 may, for example, be computed in a processor associated with the laser system as described above.

After an amount of gas has been calculated 56, the process continues to a fifth step 58. The fifth step 58 includes providing an instruction to a gas control system to provide the amount of gas to, or remove the amount of gas from, a gas compartment of the laser. The gas control system may be, for example, a gas control system according to those described above and with reference to FIGS. 2 and 3. The act of removing or providing gas to the gas compartment of the laser in this way allows the gas pressure and/or concentration to be controlled online (i.e. while the laser is generating radiation) by monitoring parameters associated with the laser.

The maximum voltage threshold $\tau_{V_{max}}$ may represent a threshold wherein voltages breaching this threshold may be undesirable for the user. The maximum voltage threshold $\tau_{V_{max}}$ may be related to a maximum allowable voltage, wherein the maximum allowable voltage may represent, for example, a voltage which is the maximum voltage that may be attained by the user due to equipment or cost factors. Alternatively the maximum allowable voltage $\tau_{V_{max}}$ may represent a voltage above which corresponds to a suboptimal efficiency and/or output energy. The maximum voltage threshold $\tau_{V_{max}}$ may be related to the maximum allowable voltage in that they may be separated by a predetermined value e.g. the maximum voltage threshold $\tau_{V_{max}}$ may be 0.1 kV less than the maximum allowable voltage. The maximum voltage threshold $\tau_{V_{max}}$ may be related to the maximum allowable voltage in that they may be separated by a fraction of the maximum allowable voltage e.g. the maximum voltage threshold $\tau_{V_{max}}$ may be 90% of the maximum allowable voltage. By having a maximum voltage threshold $\tau_{V_{max}}$ that is below the maximum allowable voltage, the gas control system may be actuated in good time before the maximum allowable voltage is attained, thereby maintaining desired conditions of use of the laser.

The above examples have been described with reference to voltage V, and maximum voltage threshold $\tau_{V_{max}}$, but the process may be operated, additionally or alternatively, with different parameters (e.g. measured and/or derived from measurements for example a filtered voltage f(V)) and/or different thresholds (constant thresholds and/or time dependent thresholds and/or shot dependent thresholds). Some implementations using different parameters and/or different thresholds are described below. These example implementations may be used in combination. That is, an online refill process may monitor one or more of voltage or current or an energy of output radiation or an amount of a consumable in the laser or any other appropriate parameter associated with the laser system.

In an example implementation, a minimum voltage threshold $\tau_{V_{min}}$ is used. The minimum voltage threshold $\tau_{V_{min}}$ may represent a threshold wherein voltages breaching this threshold are undesirable for the user. In this instance, breaching should be taken to mean that the measured parameter (voltage) is below the minimum voltage threshold $\tau_{Vmin}$. The minimum voltage threshold $\tau_{Vmin}$ may be related to a minimum allowable voltage, wherein the minimum allowable voltage may represent, for example, a voltage which is the minimum voltage that may be attained by the user due to equipment or cost factors. Alternatively the minimum allowable voltage $\tau_{Vmin}$ may represent a voltage below which corresponds to a sub-optimal efficiency and/or output energy. The minimum voltage threshold $\tau_{Vmin}$ may be related to the minimum allowable voltage in that they may be separated by a predetermined value e.g. the minimum voltage threshold $\tau_{Vmin}$ may be 0.1 kV higher than the minimum allowable voltage. The minimum voltage threshold $\tau_{Vmin}$ may be related to the minimum allowable voltage in that they may be separated by a fraction of the maximum allowable voltage e.g. the minimum voltage threshold $\tau_{Vmax}$ may be 110% of the minimum allowable voltage. By having a minimum voltage threshold $\tau_{Vmin}$ that is below the minimum allowable voltage, the gas control system may be actuated in good time before the minimum allowable voltage is attained, thereby maintaining desired conditions of use of the laser. Correspondingly to the processes described in FIGS. 4 and 5, if the measured voltage breaches the minimum voltage threshold $\tau_{Vmin}$, further method steps take place whereas, if the measured voltage does not breach the minimum voltage threshold $\tau_{Vmin}$, no action is taken and the method restarts.

In another example implementation, the input voltage V is kept constant and instead the output energy E of the laser is measured. In this instance, the relevant threshold may be one or more of a minimum energy threshold and a maximum energy threshold.

In another example implementation, a consumable of the laser is measured. For example, the amount or concentration of fluorine in a laser which uses a gas mixture of argon and fluorine may be measured. In this instance, the relevant threshold may be one or more of a minimum fluorine threshold and a maximum fluorine threshold.

Furthermore, more than one parameter may be measured. For example, a voltage may be measured and used to calculate an amount of gas required to increase pressure in the chamber. Simultaneously, an amount of a consumable may be measured and used to calculate an amount of a consumable to provide to the chamber. The two parameter measurements may both be used to calculate an amount of gas. For example a voltage and an amount of a consumable may be measured and both may be used to calculate an amount of a first gas and an amount of a second gas to be provided to the chamber to improve the pressure and/or the concentration of gas in the chamber. More than two parameters may be used to calculate an amount of gas.

Figure 6:
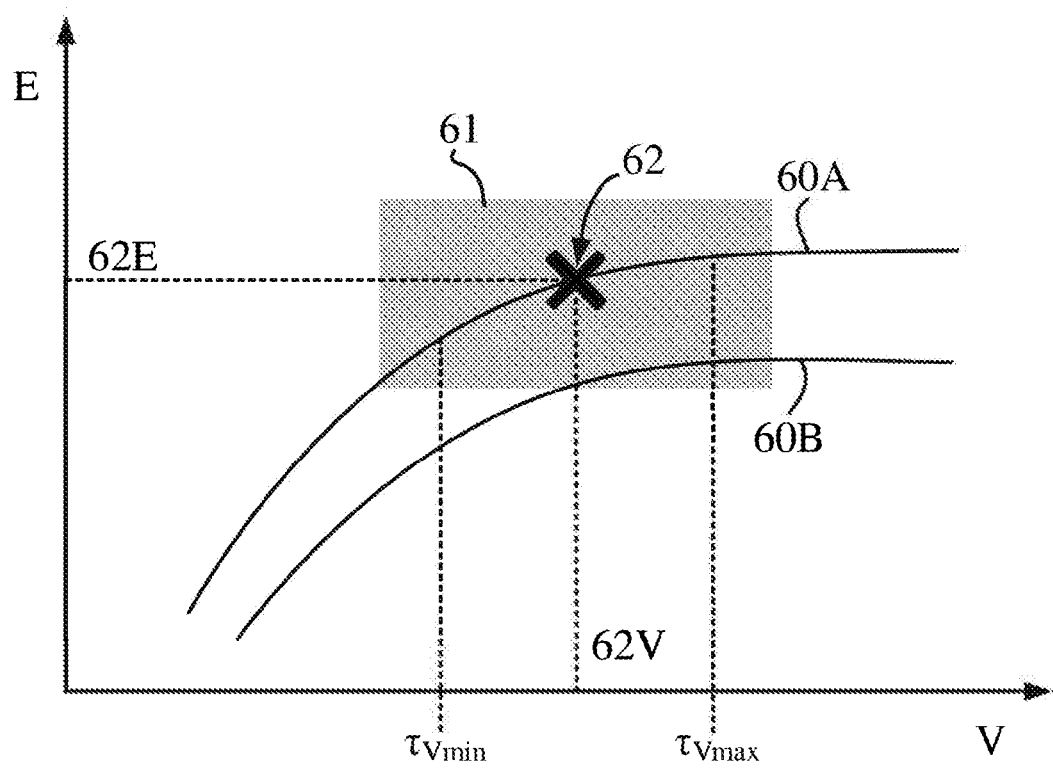
FIG. 6 is a graph that illustrates an example method of using counters to calculate an amount of gas.

FIG. 6 generally illustrates the effects of a gas control system and related methods, such as those discussed above, on the efficiency and/or energy output of an excimer laser. In particular, FIG. 6 illustrates an example use of counters for calculating an amount of gas. For example, the counters may be the counters described above with reference to FIG. 5, which are updated 54 responsive to the determination 52 that the measured voltage breaches the maximum voltage threshold $\tau_{Vmax}$. The graph in FIG. 6 depicts a voltage V applied to an excimer laser, for example to apply electrical stimulation across electrodes associated with the gas compartment, and an output energy E of the laser, i.e. the energy of radiation generated by the laser.

A first voltage-energy curve 60A depicts the typical applied voltage V and emitted energy E associated with an example laser usage. Curves such as this may be calculated theoretically or empirically measured from a real use case. The shape and position of the first voltage-energy curve 60A depends on the parameters with which the laser is operated (e.g. duty cycle, frequency of use, choice of gas, gas pressure, absolute and relative gas concentrations etc.). A second voltage-energy curve 60B depicts the typical applied voltage V and emitted energy E associated with another example laser usage, which is operated at a lower duty cycle. In this instance, the specific operation of the laser associated with the second voltage-energy curve 60B results in a lower output energy E compared to the specific operation of the laser associated with the first voltage-energy curve 60A.

As discussed above, the efficiency of a laser may be affected by a number of factors, for example the pressure of gas in the gas compartment, frequency of use, duty cycle etc. The shaded area 61 in FIG. 6 illustrates an area in which, given specific use characteristics (e.g. specific frequency of use, specific duty cycle, specific gas pressure, age of laser etc.), the laser will operate at an acceptable efficiency. That is, the efficiency is above a desired threshold efficiency. An ideal efficiency 62 is depicted within the shaded area 61, which may represent the highest achievable efficiency, which may also be referred to as the most desired efficiency. The ideal efficiency 62 for a given set of use characteristics is associated with an ideal energy 62E (or range of energies) and an ideal voltage 62V (or range of voltages). That is, to achieve the ideal efficiency 62 given specific use characteristics, it is beneficial to operate the laser at the ideal voltage 62V and subsequently the ideal energy 62E may be achieved.

Should a user wish to operate the laser with a different usage characteristic (e.g. a lower duty cycle), the voltage-energy curve may not achieve the ideal efficiency 62 or may even fall out of the shaded area 62. Should a user wish to operate the laser with a different usage characteristic (e.g. a lower duty cycle), the desired energy output may not be achievable given their different use characteristics. For example, the second voltage-energy curve 60B plateaus at an output energy below the ideal energy 62E. In such an instance, online refill can be used to control the gas pressure and/or concentration. By controlling the gas pressure and/or concentration, the efficiency and/or output energy of the laser can be improved. By controlling the gas pressure and/or concentration, a desirable output energy and/or efficiency may be achieved without compromising on the desired input voltage and/or other use characteristics. Beneficially, with online refill, a user may operate the laser at an improved efficiency and/or achieve their ideal energy output, even if they choose 'non-standard' use characteristics. For example, non-standard use characteristics may comprise one or more of using an old laser, a low duty cycle, using a laser infrequently etc.

The online refill process may be, for example, one of the processes described above with reference to FIGS. 4 and 5. The online refill may be used in combination with a gas control system such as those described above with reference to FIGS. 2 and 3.

FIG. 6 also illustrates how counters may be used to calculate an amount of gas to be provided as an instruction to a gas control system. For example, the counters may be the counters described above with reference to FIG. 5, which are updated 54 responsive to the determination 52 that the measured voltage breaches the maximum voltage threshold $\tau_{Vmax}$.

Maximum and minimum voltage thresholds $\tau_{Vmax}$, $\tau_{Vmin}$ are depicted in FIG. 6. These maximum and minimum voltage thresholds $\tau_{Vmax}$, $\mathsf{l}_{Vmin}$ may be considered comparable to those discussed above. For example, they may be related to a maximum and minimum allowable voltage of the laser. In this example, the maximum and minimum voltage thresholds $\tau_{Vmax}$, $\tau_{Vmin}$ are within the desired efficiency area 61 (e.g. 0.1 kV from the edges of the desired efficiency area 61).

The calculation utilises a minimum voltage counter $C_{Vmin}$ and a maximum voltage counter $C_{Vmax}$ These counters $C_{Vmin}$, $C_{Vmax}$ may be initialized to arbitrary values. In this instance, the counters $C_{Vmin}$, $C_{Vmax}$ are initialized to zero. This should not be construed as limiting and the counters may be initialized to any value.

The input voltage V to the laser is measured, for example the voltage required to maintain a target output energy. If the measured voltage V breaches the maximum voltage threshold $\tau_{Vmax}$, the maximum voltage counter $C_{Vmax}$ is updated. For example, the maximum voltage counter $C_{Vmax}$ may be increased by 1. Alternatively, the maximum voltage counter $C_{Vmax}$ may be increased by a function of a parameter (e.g. voltage V) and/or a threshold (e.g. $\tau_{Vmax}$), for example the maximum voltage counter $C_{Vmax}$ may be increased by the function w*(V-$\tau_{Vmax}$) where w is an arbitrary or predetermined constant. By using a function of V and $\tau_{Vmax}$, the counter can reflect the extent to which the measured voltage has breaches the threshold (i.e. the amount by which the voltage V breaches the maximum voltage threshold $\tau_{Vmax}$). For example, if the function w*(V-$\tau_{Vmax}$) is used and w is a positive number, a larger voltage will correspond to a larger increase of the maximum voltage counter $C_{Vmax}$ Beneficially, by updating the maximum voltage counter $C_{Vmax}$ by a value depending on the extent of a threshold breach, an amount of gas can be calculated which is further dependent on the extent of the threshold breach, thereby enabling more effective and/or faster control of gas pressure and/or concentration in the gas compartment.

If the measured voltage V breaches the minimum voltage threshold $\tau_{Vmin}$, the minimum voltage counter $C_{Vmin}$ is updated. For example, the minimum voltage counter $C_{Vmin}$ may be increased by 1. Alternatively, the minimum voltage counter $C_{Vmin}$ may be increased by a function of a parameter (e.g. voltage V) and/or a threshold (e.g. $\tau_{Vmin}$), for example the minimum voltage counter $C_{Vmin}$ may be increased by the function w*(V-$\tau_{Vmin}$) where w is an arbitrary or predetermined constant. By using a function of V and $\tau_{Vmin}$, the counter can reflect the extent of breaching (i.e. the amount by which the voltage V breaches the minimum voltage threshold $\tau_{Vmin}$). For example, if the function w'*($\tau_{Vmin}$-V) is used and w' is a positive number, a smaller voltage will correspond to a larger increase of the minimum voltage counter $C_{Vmin}$ Beneficially, by updating the minimum voltage counter $C_{Vmin}$ by a value depending on the extent of breaching, an amount of gas can be calculated which is further dependent on the extent of breaching, thereby enabling more effective and/or faster control of gas pressure and/or concentration in the gas compartment.

As the measuring process is repeated continuously or iteratively, the counters $C_{Vmin}$, $C_{Vmax}$ are typically updated multiple times depending on the value of the measured voltage V. The way in which counters are updated (e.g. the value, increment or proportion by which they are increased/decreased) may be referred to as an update value. The update value may be chosen based on use-cases, scientific theory, computer modelling, empirical observation, or any other suitable method.

The counters $C_{Vmin}$, $C_{Vmax}$ are then used to calculate an amount of gas. The calculation used may be chosen based on use-cases, scientific theory, computer modelling, empirical observation, or any other suitable method. The calculation may calculate an amount of gas directly or indirectly. That is, the calculation may include first calculating a characteristic of the gas (e.g. pressure, concentration) and then calculating an amount of gas. Beneficially, by calculating a gas characteristic associated with the laser, standard and known gas theory and/or empirical observations and/or use cases may be used to calculate an amount of gas. Beneficially, by calculating a gas characteristic associated with the laser, the amount of gas may be calculated accurately and efficiently.

In an example implementation, if the measured voltage V breaches the maximum voltage threshold $\tau_{Vmax}$, the maximum voltage counter $C_{Vmax}$ is increased. If the measured voltage V breaches the minimum voltage threshold $\tau_{Vmin}$, the minimum voltage counter $C_{Vmin}$ is increased. In a common use case of the voltage being too high (e.g. due to a depletion of gas in the gas compartment), the following equation can be used to calculate a required change in pressure $P_u$:

$$P_u = z \cdot \frac{C_{Vmax} - C_{Vmin}}{C_{Vmax} + C_{Vmin}} \quad \text{(Equation 1)}$$

where z is a stepsize. The stepsize z may be chosen depending on how aggressive a change in pressure is desired. For example, a small stepsize z may make a small change to the pressure, whereas a larger stepsize z may make a large change to the pressure. In some instances it may be beneficial to make large changes infrequently i.e. use a large stepsize z and a low repetition/update rate, whereas in other instances it may be preferable to make smaller changes frequently i.e. use a small stepsize z and a high repetition/update rate. An increase in gas pressure may lead to a reduction in input voltage V (i.e. a lower voltage V may be required to achieve the desired efficiency and/or output energy). A sensitivity may be used to describe the increase in pressure (e.g. in kPa) needed to lower the voltage by a specific amount (e.g. 1 Volt). The stepsize z may be chosen dependent on the sensitivity.

An amount of gas is then determined from the calculated updated pressure $P_u$, for example based on known scientific relationships, e.g. standard gas laws. This amount of gas is communicated to the gas control system, with an instruction to provide said amount of gas to, or remove said amount of gas from, the gas compartment. For example, if Pu is positive, said amount of gas may be provided to the gas compartment, whereas, if $P_u$ is negative, said amount of gas may be removed from the gas compartment.

While illustrated with reference to monitoring the input voltage V, the process may analogously be used by monitoring the output energy E at a substantially constant input voltage V, using corresponding minimum and maximum energy thresholds and minimum and maximum energy counters.

Similarly, the process may analogously be used by monitoring the amount of a consumable (e.g. a reactive gas such as fluorine), and using a minimum consumable threshold whereby, if the amount of the consumable falls below the minimum consumable threshold, an amount of a consumable gas is calculated and provided to the gas compartment.

It may be desirable at times to reset the counters $C_{Vmax}$, $C_{Vmin}$ For example, it may be desirable to reset the counters $C_{Vmax}$, $C_{Vmin}$ upon determining that a desired gas pressure and/or concentration has been reached. Resetting the counters $C_{Vmax}$ and $C_{Vmin}$ prevents further adjustments from being made and enables the system to appropriately react to future changes in the monitored characteristic (e.g. input voltage V).

Figure 7:
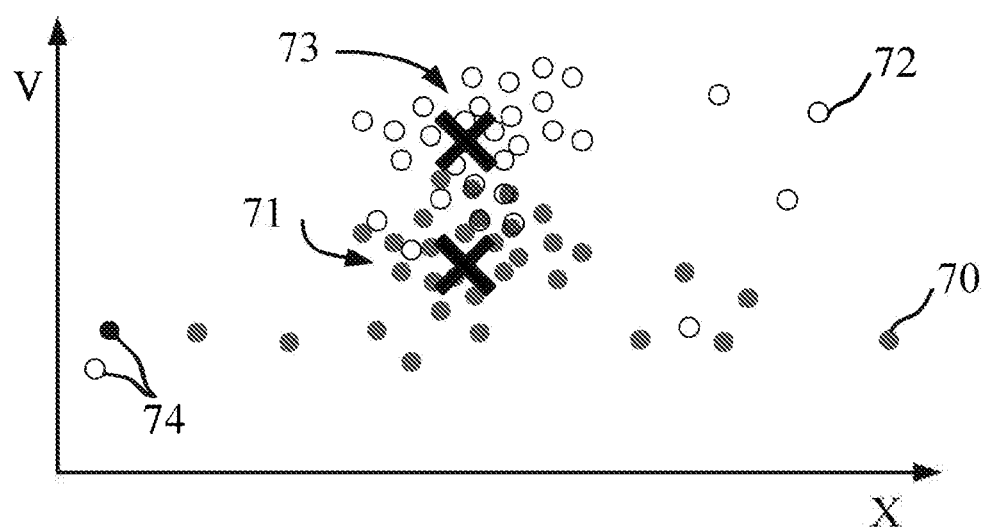
FIG. 7 is a graph that illustrates another example method of calculating an amount of gas.

FIG. 7 illustrates another example method of calculating an amount of gas. The graph depicts a graph of measurements associated with an excimer laser, in particular the voltage V and a variable X. The variable X may be chosen in dependence on the user's requirements, but may include any characteristic which may affect the voltage V, for example the duty cycle, or optical conditions associated with the laser such as the time between electrical stimulations being provided to a first gas compartment and electrical stimulations being provided to a second gas compartment of the laser. The voltage V and the parameter X are monitored over time and each measurement is recorded as a circle 70, 72 on the graph. Rather than voltage, the output energy E may be measured and recorded, wherein the parameter X may include any characteristic which may affect the output energy E. The methods described below are described in relation to measuring voltage V, but the methods can correspondingly be applied when measuring the output energy E, or correspondingly to any other measure of input electrical stimulation and/or output radiation, or a measure of a consumable in the gas compartment.

Measurements are taken during a first time period, and are denoted by filled circles 70. There are multiple measurements which may be taken at different times during the time period, for example one measurement every millionth shot or one measurement every 100 million shots. A first average (or any other function of measured parameters) 71 is found for measurements taken during the first time period 70.

Measurements are also taken during a second time period, and are denoted by empty circles 72. There are multiple measurements which may be taken at different times during the time period, for example one measurement every millionth shot or one measurement every 100 million shots. A second average or any other function 73 is found for measurements taken during the second time period 72.

The second time period may be separated in time from the first time period. The difference between time periods may, for example, be an hour, a day or a week. Alternatively, the time difference between the first and second time periods could be zero. The first time period and second time period may overlap. For example, the first time period may occur from 1 shot to 3 million shots, and the second time period may occur from 2 million shots to 50 million shots. The time periods may be time-based (e.g. seconds, hours, days etc.) and/or may be shot-based.

During the time between the first time period and the second time period, conditions within the laser may change. For example, it is likely that the pressure and/or concentration will have changed (e.g. the pressure may have reduced and/or the amount of a consumable and hence the corresponding concentration may have decreased). As a result, the efficiency and/or energy and/or voltage will change and subsequently the average will change i.e. the second average 73 will be different to the first average 71.

The average, or any function of measured parameters, may be monitored in 1-dimension, for example calculating the average voltage. Alternatively, the average may be monitored in 2-dimensions, for example both the average voltage and the average parameter X. The parameter X itself can be multi-dimension. The parameter X may comprise one or more parameters which affect the voltage V and which may be measured. Beneficially, by monitoring these averages (or any other function of measured parameters) 71, 73, and the parameter X, other factors which may affect the voltage but which cannot be directly measured (e.g. aging effects) may be accounted for.

An amount of gas (i.e. the amount of gas to be communicated to the gas control system and provided to the gas compartment) can be calculated based on the difference between the first average 71 and the second average 73. The gas control system subsequently provides and/or removes gas from the gas compartment as described above.

Rather than calculating averages 71, 73 at two distinct and temporally separated times, a moving average may be calculated. That is, a first average 71 may be calculated, for example based on a first set of measurements 70. Alternatively the first average 71 may be selected based on historical values, user-specified values, or manufacturer-specified values. Alternatively the first average 71 may be selected based on a calculation during a calibration process. A moving average may then be calculated and updated with each measurement taken. An average threshold (i.e. a threshold relating to the first average 71 and the moving average) may be chosen such that, should the moving average breach an average threshold, an amount of gas may be calculated. The average threshold may be a predetermined value (e.g. ±0.1 kV from the average voltage). Alternatively, the average threshold may be a proportion of the first average (e.g. ±10% from the first average).

It may be advantageous to apply a filter to the measurements before calculating the amount of gas. For example, outliers may be caused by erroneous measurements. Outliers may lie far from the average, as illustrated as outlying measurements 74 in FIG. 7. Inclusion of outliers may cause an erroneous amount of gas to be calculated. The negative effect of outliers may be reduced by applying a filter to the measurements, for example by disregarding all data which lies more than a certain threshold distance from the first or second average (e.g. ±50% from the first average), or by using an outlier detection algorithm. Optionally, the second average may be re-calculated following the removal of these outlying measurements.

Although specific reference may be made in this text to the use of excimer lasers for use in lithography, it should be understood that the lasers and associated systems and methods described herein may have other applications. Possible other applications include metrology apparatus and optical measurement apparatus.

Although specific reference may be made in this text to the use of a lithographic apparatus in the manufacture of ICs, it should be understood that the lithographic apparatus described herein may have other applications. Possible other applications include the manufacture of integrated optical systems, guidance and detection patterns for magnetic domain memories, flat-panel displays, liquid-crystal displays (LCDs), thin-film magnetic heads, etc.

Where the context allows, embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic storage media; optical storage media; flash memory devices; electrical, optical, acoustical or other forms of propagated signals (e.g. carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc. and in doing that may cause actuators or other devices to interact with the physical world.

Other aspects of the invention are set out in the following numbered clauses.

1. A method of controlling a gas control system of a gas compartment of a radiation source, the method comprising:
   measuring a parameter of the excimer laser, wherein the parameter describes an electrical stimulation applied to the laser and/or a characteristic of radiation generated by the laser and/or an amount of a consumable in the gas compartment;
   comparing the parameter, or a function of the parameter, to a threshold;
   calculating, responsive to determining that the parameter or function of the parameter breaches the threshold, an amount of gas to be provided or removed based on the parameter;
   providing an instruction to the gas control system to provide the amount of gas to, or remove the amount of gas from, the gas compartment.
2. The method of clause 1, wherein the radiation source continues to generate radiation during the provision of gas to, or removal of gas from, the gas compartment.
3. The method of any preceding clause, wherein calculating an amount of gas further comprises calculating a gas characteristic based on the parameter.
4. The method of clause 3, further comprising calculating the amount of gas based on the gas characteristic.
5. The method of clause 3 or 4, wherein the gas characteristic comprises a gas pressure and/or a gas concentration.
6. The method of any preceding clause, wherein the amount of gas comprises an amount of a first gas and an amount of a second gas.
7. The method of any preceding clause, wherein measuring a parameter comprises measuring a first and second parameter.
8. The method of clause 7, wherein the amount of gas is calculated based on the first and second parameter.
9. The method of clause 7 or 8, wherein the first parameter is the amount of a consumable in the gas compartment.
10. The method of any preceding clause further comprising using a sensor to measure the amount of a consumable in the gas compartment.
11. The method of clause 10, wherein the sensor comprises a reactive gas sensor.
12. The method of clause 11, wherein the sensor comprises a fluorine sensor.
13. The method of any preceding clause, wherein the threshold comprises a function of a predetermined parameter.
14. The method of any preceding clause, the method further comprising, responsive to determining that the function of the parameter exceeds the threshold, updating a counter.
15. The method of clause 14, wherein the calculation of the amount of gas is additionally based on the counter.
16. The method of any of any preceding clause, the method further comprising:
    recording a first set of measurements of the parameter;
    calculating a first function of said first set of measurements;
    recording a second set of measurements of the parameter;
    calculating a second function of said second set of measurements;
    calculating the amount of gas based on the first and second functions.
17. A radiation source comprising a gas compartment, a gas control system configured to provide an amount of gas to, or remove an amount of gas from, the gas compartment, and a processor configured to perform the method of any of clauses 1 to 16.
18. The radiation source of clause 17, wherein the gas control system comprises a first pipeline connected at a first end to a first gas source and at a second end to the gas compartment.
19. The radiation source of clause 18, wherein the gas control system further comprises a second pipeline connected at a first end to a second gas source and at a second end to the gas compartment.
20. The radiation source of clause 18 or 19, further comprising a gas control apparatus configured to control a flow of gas between the gas compartment and the first and/or second gas sources.
21. The radiation source of any of clauses 17 to 20, further comprising a sensor configured to measure an amount of a consumable in the compartment.
22. The radiation source of clause 21, wherein the sensor is located in the gas compartment.
23. The radiation source of clause 21 or 22, wherein the sensor comprises a reactive gas sensor.
24. The radiation source of any of clauses 21 to 23, wherein the sensor comprises a fluorine sensor.
25. A radiation source comprising a gas compartment and a sensor for measuring an amount of a consumable in the gas compartment.
26. The radiation source of clause 25, wherein the sensor comprises a reactive gas sensor.
27. The radiation source of clause 26, wherein the sensor comprises a fluorine sensor.
28. The radiation source of any of clauses 25 to 27, further comprising a gas control system configured to provide an amount of gas to, or remove an amount of gas from, the gas compartment.
29. A gas control system configured to provide an amount of gas to, or remove an amount of gas from, a gas compartment of a radiation source, and further configured to perform the method of any of clauses 1 to 16.
30. The gas control system of clause 29, wherein the gas control system comprises a first pipeline configured for connection at a first end to a first gas source and at a second end to the gas compartment.
31. The gas control system of clause 30, further comprising a second pipeline configured for connection at a first end to a second gas source and at a second end to the gas compartment.
32. The gas control system of any of clauses 29 to 31, further comprising a gas control apparatus configured to control a flow of gas between the gas compartment and the first and/or second gas source.
33. The radiation source of any of clauses 17 to 28, further comprising a processor configured to perform the method of any of clauses 1 to 16.
34. A lithographic apparatus comprising the radiation source of any of clauses 17 to 28 or clause 33.

35. A computer program comprising instructions to cause the device of any of clauses 17 to 34 to execute the steps of the method of clauses 1 to 16.

36. A computer-readable medium having stored thereon the computer program of clause 35.

The above described implementations and other implementations are within the scope of the claims. While specific embodiments of the invention have been described above, it will be appreciated that the invention may be practiced otherwise than as described. The descriptions above are intended to be illustrative, not limiting. Thus it will be apparent to one skilled in the art that modifications may be made to the invention as described without departing from the scope of the claims set out below.

What is claimed is:

1. A method of controlling a gas control system of a gas compartment of a radiation source, the method comprising:
    measuring a parameter of an excimer laser, wherein the parameter describes an electrical stimulation applied to the excimer laser and/or a characteristic of radiation generated by the excimer laser and/or an amount of a consumable in the gas compartment;
    comparing the parameter, or a function of the parameter, to a threshold;
    calculating, responsive to determining that the parameter or function of the parameter breaches the threshold, an amount of gas to be provided to the gas compartment based on the parameter; and
    providing an instruction to the gas control system to provide the amount of gas to the gas compartment while the radiation source continues to generate radiation during the provision of gas to the gas compartment.

2. The method of claim 1, wherein calculating the amount of gas further comprises calculating a gas characteristic based on the parameter.

3. The method of claim 2, wherein calculating the amount of gas is further based on the gas characteristic.

4. The method of claim 2, wherein the gas characteristic comprises a gas pressure and/or a gas concentration.

5. The method of claim 1, wherein the amount of gas comprises an amount of a first gas and an amount of a second gas.

6. The method of claim 1, wherein measuring the parameter comprises measuring a first parameter and a second parameter.

7. The method of claim 6, wherein the amount of gas is calculated based on the first and second parameters.

8. The method of claim 6, wherein the first parameter is the amount of the consumable in the gas compartment.

9. The method of claim 1, further comprising using a sensor to measure an amount of the consumable in the gas compartment.

10. The method of claim 9, wherein the sensor comprises a reactive gas sensor.

11. The method of claim 9, wherein the sensor comprises a fluorine sensor.

12. The method of claim 1, wherein the threshold comprises a function of a predetermined parameter.

13. The method of claim 1, further comprising, responsive to determining that the function of the parameter exceeds the threshold, updating a counter.

14. The method of claim 13, wherein calculating the amount of gas to be provided to the gas compartment is additionally based on the counter.

15. The method of claim 1, further comprising:
    recording a first set of measurements of the parameter;
    calculating a first function of the first set of measurements;
    recording a second set of measurements of the parameter;
    calculating a second function of the second set of measurements; and
    calculating the amount of gas to be provided to the gas compartment based on the first and second functions.

16. A radiation source comprising a gas compartment, a gas control system configured to provide an amount of gas to the gas compartment, and configured to perform a method comprising:
    measuring a parameter of the excimer laser, wherein the parameter describes an electrical stimulation applied to the excimer laser and/or a characteristic of radiation generated by the excimer laser and/or an amount of a consumable in the gas compartment;
    comparing the parameter, or a function of the parameter, to a threshold;
    calculating, responsive to determining that the parameter or function of the parameter breaches the threshold, the amount of gas to be provided to the gas compartment based on the parameter; and
    providing an instruction to the gas control system to provide the amount of gas to the gas compartment while the radiation source continues to generate radiation during the provision of the amount of gas to the gas compartment.

17. The radiation source of claim 16, wherein the gas control system includes a first pipeline connected at a first end to a first gas source and at a second end to the gas compartment.

18. The radiation source of claim 17, wherein the gas control system further comprises a second pipeline connected at a first end to a second gas source and at a second end to the gas compartment.

19. The radiation source of claim 18, further comprising a gas control apparatus configured to control a flow of gas between the gas compartment and the first and/or second gas sources.

20. The radiation source of claim 16, further comprising a sensor configured to measure the amount of the consumable in the gas compartment.

21. The radiation source of claim 20, wherein the sensor is located in the gas compartment.

22. The radiation source of claim 20, wherein the sensor comprises a reactive gas sensor.

23. The radiation source of claim 20, wherein the sensor comprises a fluorine sensor.

24. The radiation source of claim 16, further comprising a processor configured to perform the method.

25. The radiation source of claim 24, further comprising a computer-readable medium having stored thereon a computer program comprising instructions for the processor to perform the method.

26. A lithographic apparatus comprising the radiation source of claim 16.

27. The method of claim 1, further comprising:
    calculating, responsive to determining that the parameter or function of the parameter breaches the threshold, an amount of gas to be removed from the gas compartment based on the parameter; and
    providing an instruction to the gas control system to remove the amount of gas from the gas compartment while the radiation source continues to generate radiation during the removal of gas from the gas compartment.

28. The radiation source of claim 16, wherein the method performed by the gas control system further comprises:
- calculating, responsive to determining that the parameter or function of the parameter breaches the threshold, an amount of gas to be removed from the gas compartment based on the parameter; and
- providing an instruction to the gas control system to remove the amount of gas from the gas compartment while the radiation source continues to generate radiation during the removal of gas from the gas compartment.

* * * * *